(12) United States Patent
Zweighaft et al.

(10) Patent No.: US 6,565,029 B2
(45) Date of Patent: May 20, 2003

(54) METHOD OF DETECTING AND CORRECTING FOR SLIPPAGE OF A TAPE MEDIA IN A TAPE STORAGE DEVICE

(75) Inventors: James Zweighaft, Boulder, CO (US); David B. Daniel, Longmont, CO (US)

(73) Assignee: Quantum Corp., Milpitas, CA (US)

( * ) Notice: Subject to any disclaimer, the term of this patent is extended or adjusted under 35 U.S.C. 154(b) by 22 days.

(21) Appl. No.: 09/885,660

(22) Filed: Jun. 20, 2001

(65) Prior Publication Data

US 2002/0195512 A1 Dec. 26, 2002

(51) Int. Cl.⁷ ............................................... G11B 15/46
(52) U.S. Cl. ............................... 242/334.4; 242/534.2; 242/563.2; 360/71
(58) Field of Search ................... 242/334.4, 534.2, 242/563.2; 360/71

(56) References Cited

U.S. PATENT DOCUMENTS

| | | | |
|---|---|---|---|
| 3,704,401 A | * 11/1972 | Miller | ............. 242/334.4 X |
| 3,982,160 A | * 9/1976 | Goldschmidt et al. | ... 242/334.4 X |
| 4,037,260 A | 7/1977 | Busby, Jr. et al. | |
| 4,107,745 A | 8/1978 | Burke, Jr. | |
| 4,151,566 A | 4/1979 | Ohrman | |
| 4,389,600 A | 6/1983 | Milligan et al. | |
| 5,319,503 A | 6/1994 | Hasegawa et al. | |
| 5,781,359 A | * 7/1998 | Otsuki et al. | ................. 360/71 |
| 5,793,581 A | 8/1998 | Back, Sr. | |
| 5,829,702 A | 11/1998 | Zweighaft | |
| 6,305,629 B1 | * 10/2001 | Chliwnyj et al. | ......... 360/71 X |

* cited by examiner

Primary Examiner—Kathy Matecki
Assistant Examiner—Minh-Chau Pham
(74) Attorney, Agent, or Firm—Patton Boggs LLP (57) ABSTRACT

A method for detecting slippage in a tape path, and re-calibrating a sensing assembly in a tape storage device to account for the slippage. The method includes sensing a position of one of a supply reel and a take-up reel. In response to sensing the position of the supply reel or take-up reel, sensing a position of a guide roller. The position of the guide roller corresponds to the position of the guide roller when the position of the supply reel or the take-up reel is sensed. In response to sensing the position of the guide roller, the tape media is wound through the tape path between the supply reel and the take-up reel. In response to winding the tape media through the tape path, a second position of the one of the supply reel and the take-up reel is sensed. In response to sensing the second position of the one of the supply reel and the take-up reel, a second position of the guide roller is sensed. The second position of the guide roller corresponds to the position of the guide roller when the second position of the one of the supply reel or the take-up reel is sensed. In response to sensing the second position of the guide roller, a position difference between the first position of the guide roller and the second position of the guide roller is determined. The position difference is compared to a previous position difference to determine a relative difference in position, which is used to detect slippage.

14 Claims, 9 Drawing Sheets

METHOD OF DETECTING AND CORRECTING FOR SLIPPAGE OF A TAPE MEDIA IN A TAPE STORAGE DEVICE

FIELD OF THE INVENTION

The invention relates to tape storage devices, and in particular, to a method of detecting and correcting for slippage of tape media in a tape storage device.

PROBLEM

Tape storage devices have been widely employed in industry for over thirty years due to their ability to store large amounts of data on a relatively small inexpensive removable format. Tape storage devices are available in a variety of designs, but in all cases, magnetic tape media is wound between a pair of tape reels, known in the art as a supply reel and a take-up reel, as data records are exchanged. It is important in data storage to efficiently organize large quantities of data records on a single tape media without overwriting existing data records. During operation, tape storage devices must be able to precisely determine the location and position of the tape media at all times. To accomplish this task, various methods have been employed. One method is to write special identifying marks on the tape media using the same read/write head or heads that are used to record the data records. The recording head then references the various identifying marks to determine the location and position of the tape media. These identifying marks are placed at regular intervals or where one data record ends and another begins.

Unfortunately, when the tape media is wound at high speeds, the read/write head cannot keep up with the winding operation to determine location. In this case, an electromechanical device is used to track the distance the tape media travels with reference to the beginning of the tape ("BOT"). One such device is a rotation sensor that counts revolutions of a rotating magnet in one or both of the tape reel drive motors. The rotation sensor outputs pulses that are counted to provide information indicative of the length of tape that is wound on or off of a tape reel. Unfortunately, because they detect rotation of the tape reel motor magnet, rotation sensors typically have a limited resolution of 8 to 16 pulses per motor revolution.

Another device used to track the distance the tape media travels with reference to the BOT is a tachometer. The tachometer is connected to one of the guide rollers in the tape path and provides much higher resolution than rotation sensors. Since the guide rollers are driven directly by frictional contact with the tape media, any count of the rotational position is directly proportional to the distance along the tape media from the BOT. Similar to rotation sensors, tachometer sensors output pulses that are counted to provide information indicative of the length of tape that has passed over a guide roller. The tachometer information is mechanically derived and its accuracy depends upon maintaining a constant relationship between the number of tachometer pulses generated and the actual longitudinal length of tape transported past the magnetic head location.

Tachometers and rotation sensors, however, produce inaccurate results if slippage occurs in the tape transport device. Slippage can occur at a variety of interfaces. One well recognized slippage, known in the art as "tach slip," results when the tape media slips relative to a guide roller that is driving the tachometer. Tach slip can occur suddenly and drastically when the tape media is accelerated or stopped, especially if tension control is poor or the roller is contaminated with dirt and dust. In addition, tach slip can occur gradually over a long distance, eventually building into a significant error. This phenomenon is known in the art as "creep".

Another well recognized slippage, known in the art as "interlayer slip," occurs between the layers of the tape media wound around a tape reel. Both Interlayer slip and tach slip can occur gradually, or suddenly and drastically. In some cases, the slippage is so severe that tape layers become folded back across one another, a phenomenon known in the art as a "Z fold."

Regardless of the cause, slippage results in inaccurate knowledge of tape position. This in turn leads to an inability to find data on the tape media or to more serious situations such as running the tape media off the reel completely.

Solution

The present invention overcomes the problems outlined above and advances the art by providing a method for detecting and re-calibrating a position sensing assembly in a tape storage device to account for slippage so that the location and position of the tape media is known at all times. In a first example of the present invention, the method comprises sensing a position of one of a supply reel and a take-up reel. In response to sensing the position of the supply reel or the take-up reel, a guide roller position is sensed. The guide roller position corresponds to the position of the guide roller when the position of the one of the supply reel or the take-up reel is sensed. In response to sensing the position of the guide roller, the tape media is wound between the supply reel and the take-up reel. In response to winding the tape media, a second position of the one of the supply reel and the take-up reel is sensed. In response to sensing the second position of the one of the supply reel and the take-up reel, a second position of the guide roller is sensed. The second position of the guide roller corresponds to the position of the guide roller when the second position of the one of the supply reel or the take-up reel is sensed. In response to sensing the second position of the guide roller, a position difference between the first position of the guide roller and the second position of the guide roller is determined. The position difference is compared to a previous position difference to determine a relative position difference, which is used to detect slippage.

Because the tape media is relatively thin, the position difference is relatively small where no slip occurs. if slippage occurs, the difference in position is significantly larger in absolute value terms because it will include the normal difference in position of the guide roller 109 and an amount of slippage. If slippage is detected, a correction is made in the tape storace device to account for the amount of slippage.

In another example of the present invention, a position difference is determined for both the take-up reel and the supply reel to more accurately detect slippage. In this example, a first position of one of the supply reel and the take-up reel is sensed. Substantially simultaneously, a first corresponding position of the guide roller is sensed. In response to sensing the position of the guide roller, a first position of the other one of the supply reel and the take-up reel is sensed. Substantially simultaneously, a second corresponding position of the guide roller is sensed. In response to sensing the second position of the guide roller, the tape media is wound between the supply reel and the take-up reel. In response to winding the tape media, a second position of the first one of the supply reel and the take-up reel to complete one full revolution is sensed. Substantially simultaneously, a third corresponding position of the guide roller is sensed. In response to sensing the third corresponding position of the guide roller, a relative position difference is determined for the first one of the supply reel and the take-up reel to complete one full revolution. The first position difference is used as described above to determine if slippage occurred. In response to determining that slippage occurred, a correction is made in the tape storage device to account for the amount of slippage. In response to determining that slippage did not occur, a second position of the other one of the supply reel and the take-up reel to complete one full revolution is sensed. Substantially simultaneously, a fourth corresponding position of the guide roller is sensed. In response to sensing the fourth position of the guide roller, a relative position difference is determined for the other one of the supply reel and the take-up reel. The relative position difference is also used to determine if slippage occurred. In response to determining that slippage did occur, a correction is made in the tape storage device to account for the amount of slippage. In response to determining that slippage did not occur, the position change of the supply reel and the take-up reel is continually monitored for slippage.

In the context of the present invention, the first, second, third, fourth, etc. connotations used to reference the tape storage device elements and positions are used for the purpose of differentiating between different elements and positions and are not used to indicate a specific sensing sequence.

DETAILED DESCRIPTION

For purposes of illustration and not of limitation, various features and advantages of the present invention will now be described within the context of a single reel half-inch DLT tape drive. It is to be understood that the following description with respect to a DLT tape drive is not intended to limit the scope of the present invention. It would be obvious to one skilled in the art that the principles of the present invention could be easily applied to other tape storage device formats.

Figure 1:
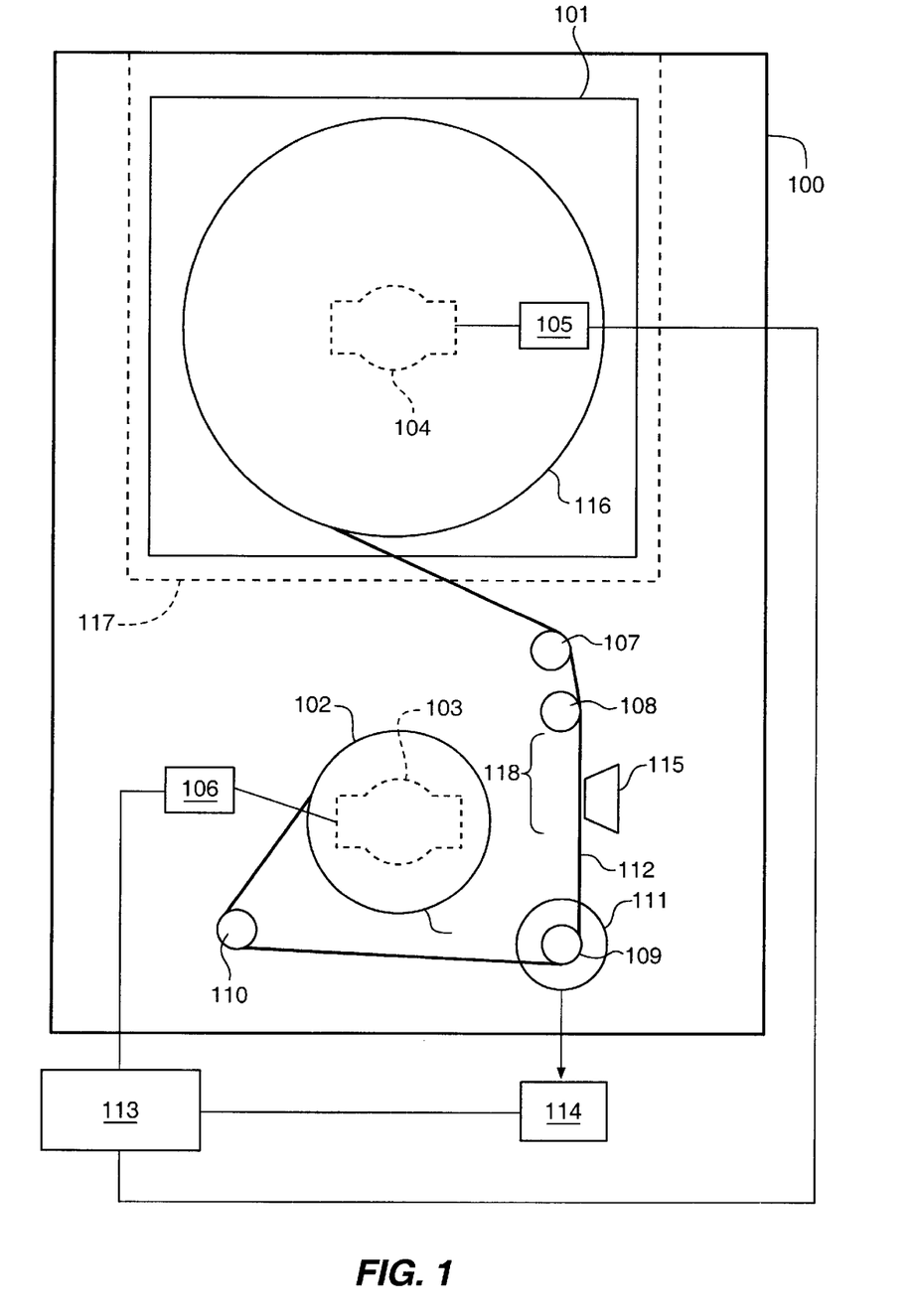
FIG. 1 illustrates a tape storage device and sensing system configured to operate in accordance with the method of the present invention.

FIG. 1 illustrates a tape drive 100 configured to operate in accordance with the present method. The tape drive 100 includes a tape head 115, an internal take-up reel 102 driven by a take-up reel drive motor 103 and a tape cartridge receiver 117. Magnetic tape media 112 is provided to the tape drive 100 by the tape cartridge 101 inserted into the tape cartridge receiver 117. The tape cartridge 101 includes the supply reel 116 driven by a supply reel drive motor 104 when the tape cartridge 101 is loaded into the tape cartridge receiver 117. A tape path 118 is defined in the tape drive 100 by the supply reel 116, a plurality of guide rollers 107–110, and the take-up reel 102.

The supply reel drive motor 104 includes a first position sensor system 105 connected to a processor 113. The first position sensor system 105 provides feedback to the processor 113 on the rotational position of the supply reel motor 104. The take-up reel motor 103 includes a second position sensor system 106 connected to the processor 113. The second position sensor system 106 provides feedback to the processor 113 on the rotational position of the take-up reel motor 103. The position sensor systems 105 and 106 could be any sensor device or group of sensor devices configured to detect the position of the supply reel motor 104 and the take-up reel motor 103 respectively. One example of the sensor system 105 includes three Hall sensors offset from one another by a fixed amount to detect the magnetic field of a rotating permanent magnet in the supply reel motor 104. One example of the sensor system 106 also includes three Hall sensors, each offset by a fixed amount to detect the magnetic field of a rotating permanent magnet in the take-up reel motor 103.

The guide roller 109 includes a third position sensor system that provides feedback to the processor 113 on the rotational position of the guide roller 109. One example of the third position sensor system is an optical rotation sensor or tachometer 111 and a counter 114. The tachometer 111 is connected to the counter 114, which is connected to the processor 113. Operationally, pulses from the tachometer 111 are processed by the counter 114 to generate a numeric count that is read by the processor 113. A linear distance of tape media travel over the guide roller 109 is yielded by multiplying the numeric tachometer count by the diameter of the guide roller 109. The smaller diameter of the guide roller 109 causes it to rotate faster than either the take-up reel 102 or the supply reel 116 (even if a reel is empty) and thus, it counts many times per rotation of either reel 116 or 102. Typically, the diameter of the take-up reel 102 and the supply reel 116 ranges from about 1.5 to 3.0 inches as it fills up. In contrast, the diameter of the guide roller 109 is approximately 0.6 inches. In one example of the present method, the tachometer counts 625 counts per rotation for an empty reel, e.g. reel 116 and up to 1458 counts for a full reel, e.g. reel 102.

According to the method of the present invention, repeated sensing is used to drive a sequence of tachometer counts for the guide roller 109 relative to an angular position of one or both of the supply reel 116 and the take-up reel 102. As magnetic tape is wound from the supply reel 116 to the take-up reel 102 in a forward direction, the tachometer 111 counts at a constant rate if the tape speed is constant in linear terms, e.g., inches per second. The hail sensors of the position sensor systems, 105 and 106, are directly connected to the motors 103 and 104 end are of relatively low resolution, commonly 48 counts per revolution. The hall sensors sense the field produced by the rotating magnets in the motors, 103 and 104, and are necessary for the operation of the motors 103 and 104. The hall sensors are also read, counted and used by the processor 113 to indicate when a certain angular position of the reels 116 and 102 is reached. The angular position occurs once per rotation and is indicated by a fixed location known as an "index" mark. The linear distance of the tape media travel over the supply reel 116 and the take-up reel 102, is yielded by multiplying the respective radius of the supply reel 116 and the take-up reel 102 by the output from the respective one of the first and second position sensor systems 105 and 106. Advantageously, eccentricity effects are minimized if a reel position is checked once per revolution or at an integral number of revolutions.

Figure 2:
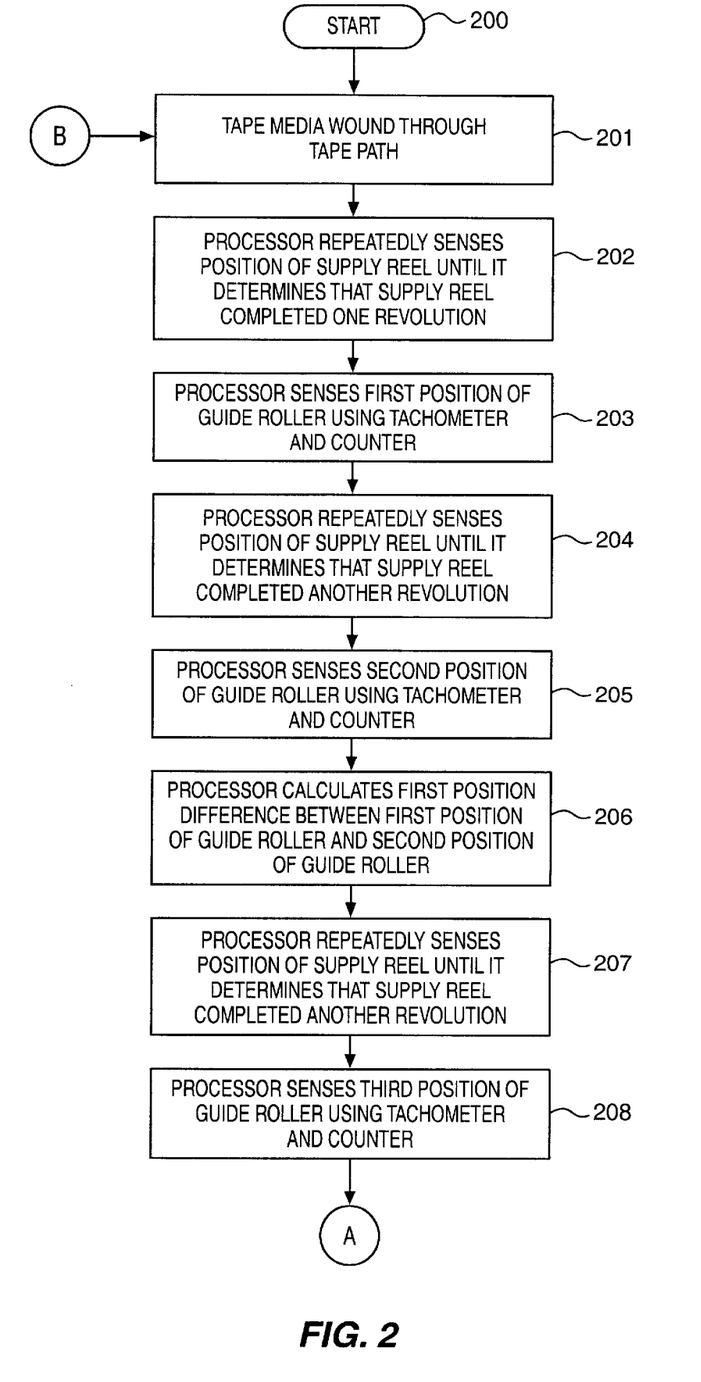
FIGS. 2 and 3 are a flow chart illustrating an example of the method according to the present invention.
Figure 3:
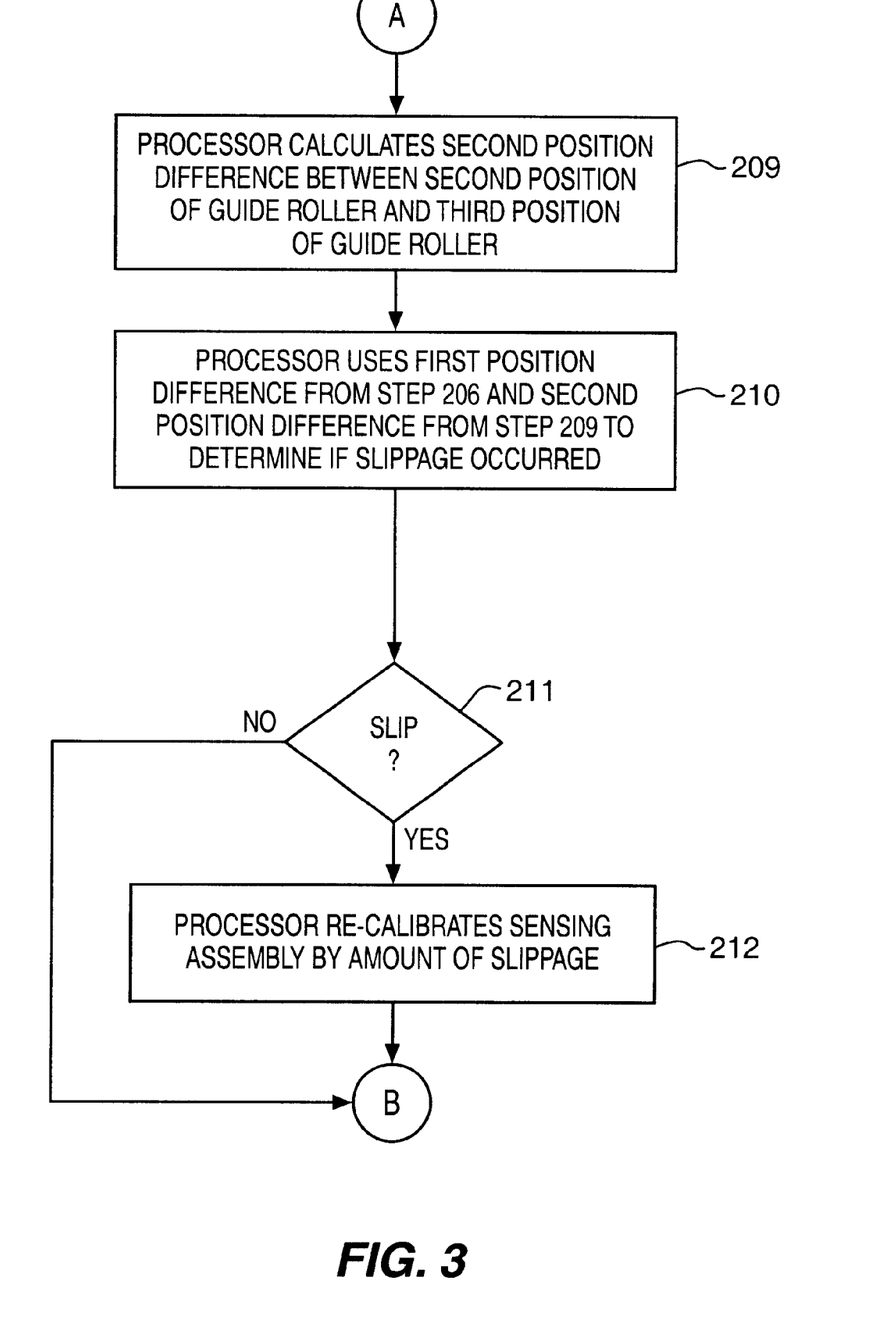

FIGS. 2 and 3 are a flowchart illustrating an example of the method according to the present invention. The present method uses repeated position sensing of the guide roller 109 to derive a sequence of guide roller position counts each time the supply reel 116 completes one full revolution. Each time a position count is derived a difference in the current position count and a previous position count is calculated. Because the tape media 112 is very thin, the radius of the supply reel 116 changes by a small amount each time the supply reel 116 completes one revolution. Consequently, the calculated difference values (which are simply proportional to the diameter of the supply reel 116) also change slowly absent slippage of the tape media. For example, as the tape media 112 is wound from the supply reel 118 to the take-up reel 102 in a forward direction, the tachometer 111 counts at a constant rate if the tape speed is constant in linear terms, e.g., inches per second. The position of the guide roller 109 is sensed using the tachometer 111 and counter 114 each time the supply reel 116 completes one full revolution. Each time the supply reel 116 completes a revolution, the processor 113 calculates a difference in the current sensed position of the guide roller 109 and a subsequent sensed position of the guide roller 109. If slippage occurs, the current calculated difference is significantly larger than the previous calculated difference because it will include the normal difference in position of the guide roller 109 and an amount of slippage.

It should be noted that the method and results are identical where the sequence of guide roller position counts are sensed each time the take-up reel 102 completes one full revolution. Those skilled in the art will also appreciate that the present method works where the position of the guide roller 109 is sensed at any point during a revolution, e.g. at half a revolution, so long as subsequent sensing is done at the same interval although the effects of reel eccentricity may affect the accuracy of the calculations. Finally, those skilled in the art will also appreciate that this example assumes that slippage occurs at the guide roller 109, if it occurs at all.

On FIG. 2 the operation begins at step 200. At step 201 the tape media 112 is wound in the forward direction from the supply reel 116 to the take-up reel 102. The tachometer 111, attached to the guide roller 109, also moves at this time, and the associated bi-directional tachometer position counter 114 increments. At step 202, the processor 113 repeatedly senses the position of the supply reel 116 until it is determined that the supply reel 116 has completed one revolution as indicated by the index mark or other appropriate means. Substantially simultaneously to sensing the index mark, the processor 113 senses a first position of the guide roller 109 using the tachometer 111 and counter 114, at step 203. In the context of the present invention, sensing the position of the guide roller 109 is representative of reading the tachometer count from the counter 114 and storing the tachometer count in the processor 113. At step 204, the processor 113 repeatedly senses the position of the supply reel 116 until it is determined that the supply reel 116 has completed another revolution as indicated by the index mark. Substantially simultaneously to sensing the index mark, the processor 113 senses a second position of the guide roller 109 using the taphometer 111 and counter 114, at step 205. At step 206, the processor 113 calculates a first position difference between the first position of the guide roller 109 and the second position of the guide roller 109. For example if the first position count of the guide roller 109 is (100) and the second position count of the guide roller 109 is (301), as indicated by the tachometer count, the first position difference is equal to (201). To clarify the first position difference (201) is equal to the second position (301) minus the first position (100).

Figure 7:
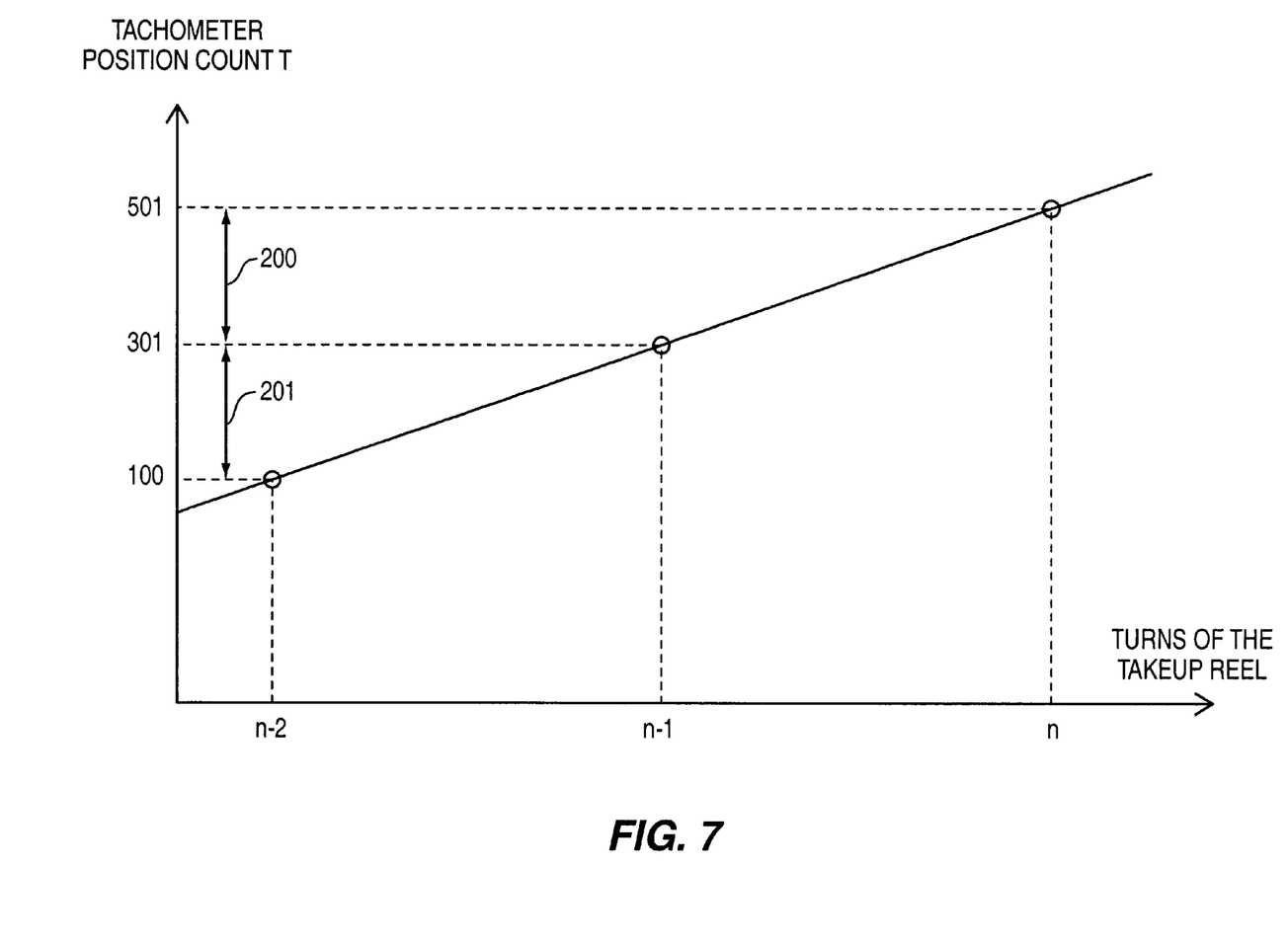
FIG. 7 is a graphical representation of position counts according to the method of the present invention wherein the reels rotate continuously in a single direction and no slip is detected.

At step 207, the processor 113 repeatedly senses the position of the supply reel 116 until it is determined that the supply reel 116 has completed another revolution as indicated by the index mark. Substantially simultaneously to sensing the index mark, the processor 113 senses a third position of the guide roller 109 using the tachometer 111 and counter 114, at step 208. At step 209, the processor 113 calculates a second position difference between the second position of the guide roller 109 and the third position of the guide roller 109. Continuing with the above example where the second position of the guide roller 109 is (301) and assuming the third position of the guide roller 109 is (501), as indicated by tho tachometer count, the second position difference is equal to (200). These values are shown in FIG. 7, which can be used as an example for the supply reel calculations which are done in the same manner as those for the takeup reel. At step 210, the processor 113 uses the first position difference from step 206 and the second position difference from step 209 to determine if slippage occurred.

To determine if slippage occurred, the processor 113 compares the first position difference at step 206 to the second position difference at step 209 to determine a compound position difference. If the absolute value of the compound position difference is less than or equal to a predetermined threshold, the processor 113 determines that slippage of the tape media 112 did not occur. However, if the compound position difference is greater than the predetermined threshold, the processor 113 determines that slippage of the tape media 112 occurred. Because the tape media 112 is relatively thin, the compound position difference, which represents the rate of change of the reel diameter, is relatively small where no slip occurs. For example, the compound position difference is typically between negative one (−1) and one (1). The predetermined threshold is chosen to be greater than the normally expected value. For example, if the expected value of is between (−1) and (1) as noted above, then the threshold is set to S to allow some tolerance in the system. If slippage occurs, the compound position difference is significantly larger because it will include the position difference of the guide roller 109 and an amount of slippage.

Continuing with the above example, the processor 113 calculates a compound position difference of (−1) by subtracting the first position difference of (201) from the second position difference of (200). The processor 113 compares the compound position difference of (−1) to the predetermined threshold of 5 to determine that slippage of the tape media did not occur.

Figure 8:
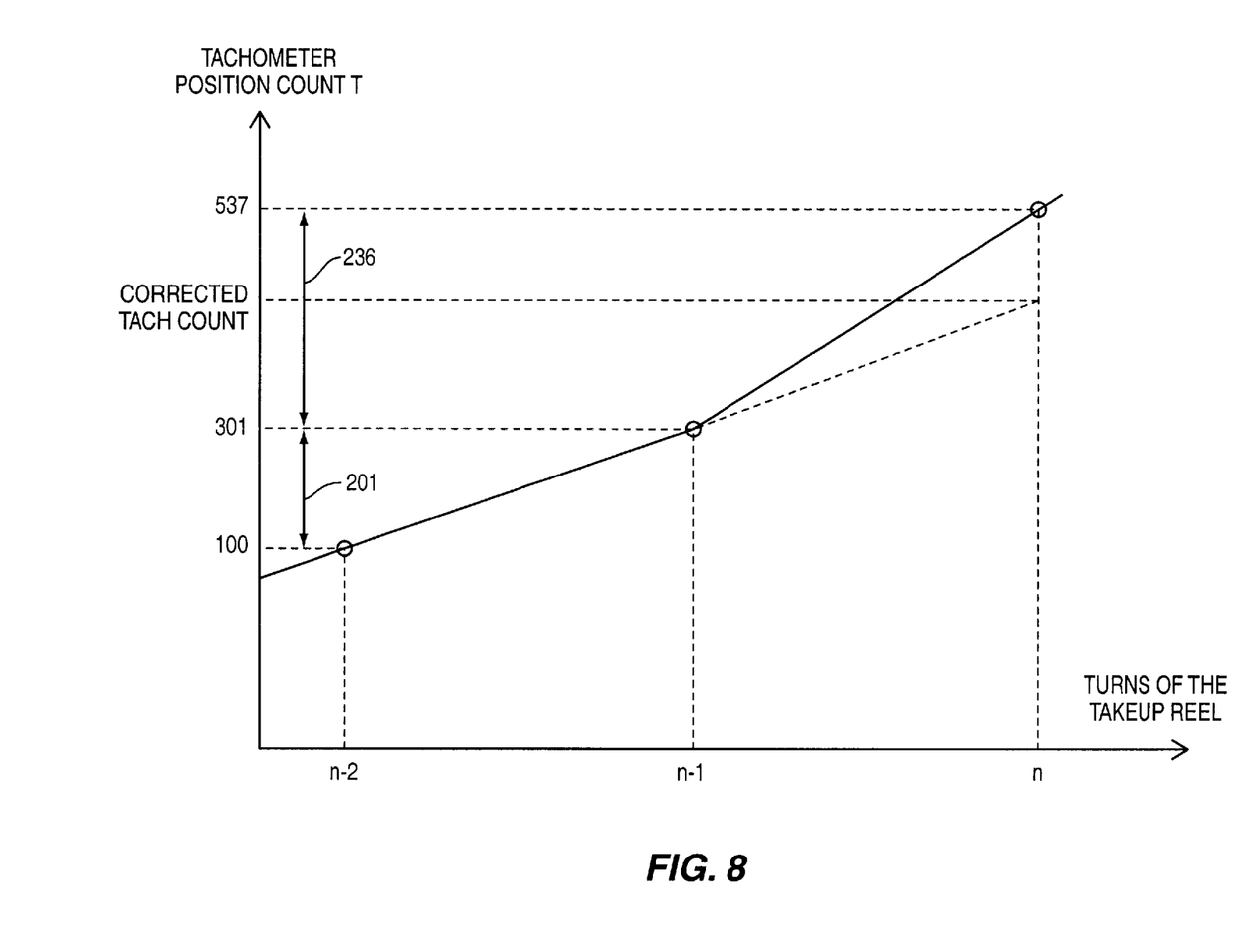
FIG. 8 is a graphical representation of position counts according to the method of the present invention wherein the reels rotate in a single direction and slip is detected.

If however, the third position of the guide roller 109, at step 209, is indicated by the tachometer count to be equal to (537) as shown in FIG. 8, then the second position difference is equal to (236) i.e., the difference between the second position (301) and the third position (537). In this case the processor 113 calculates a compound position difference of (35) by subtracting the first position difference of (201) from the second position difference of (236). The processor 113 compares the absolute value of the compound position difference of (35) to the predetermined threshold of 5 to determine that the tape media 112 slipped at the guide roller 100.

If at step 211, the processor 113 detects a slippage condition, the processor 113 re-calibrates the third positioning system by correcting the counter 114 by the amount of slippage at step 212. Continuing with the above example where the compound position difference is equal to (35) indicating slippage of the tape media 112, the processor 113 pro-loads the counter 114 with the expected value of (502), which is calculated by subtracting the excessive compound difference of (35) from the third position (537). In other words, the straight line between samples n−2 and n−1 in FIG. 8 is extrapolated to position n. After correcting for the slippage and new position of the tape media 112, the method continues as steps, 200–212, are repeated to continue sensing for slippage of the tape media 112. If at step 211, the processor 113 does not detect a slippage condition, steps, 200–212, are repeated to continue sensing for slippage of the tape media 112.

Figure 4:
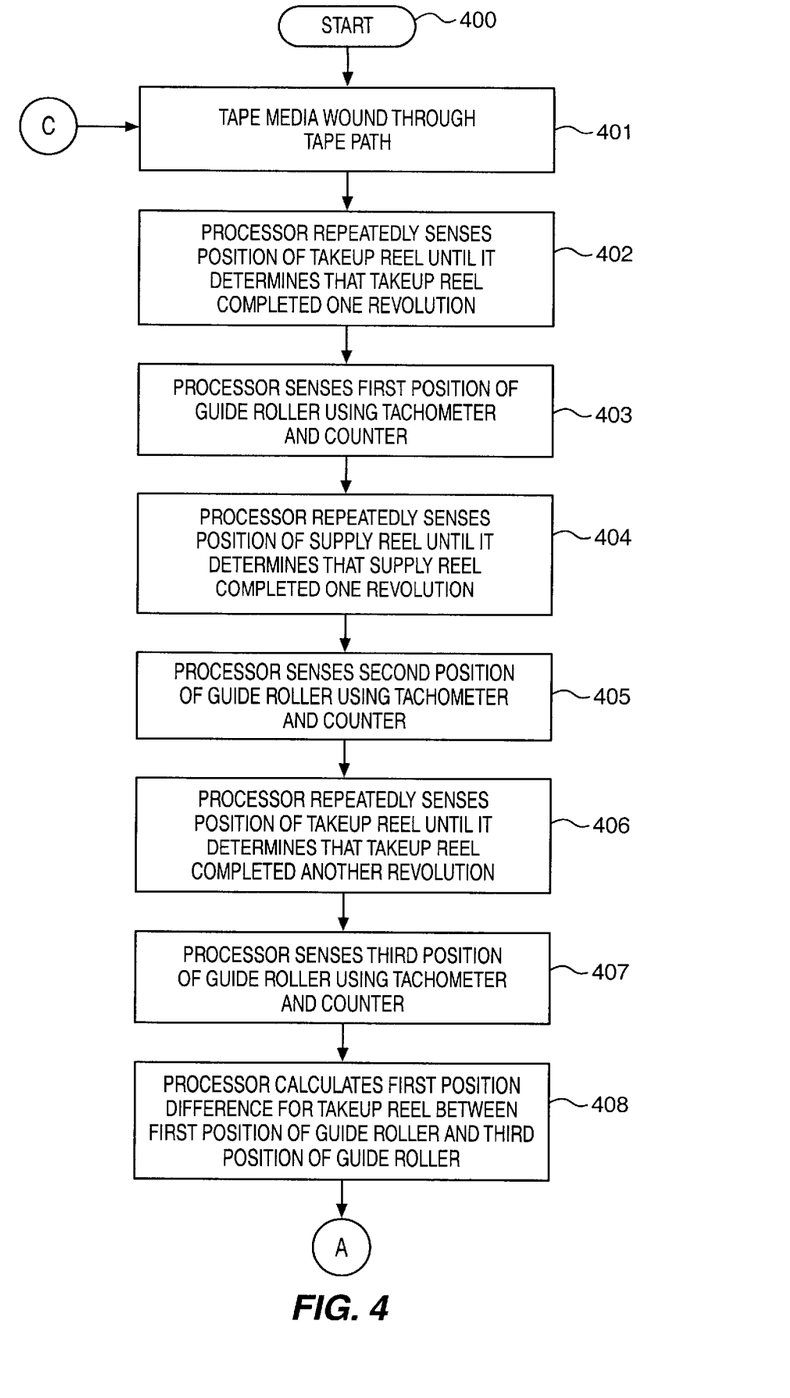
FIGS. 4, 5, and 6 are a flowchart illustrating another example of the method according to the present invention.
Figure 5:
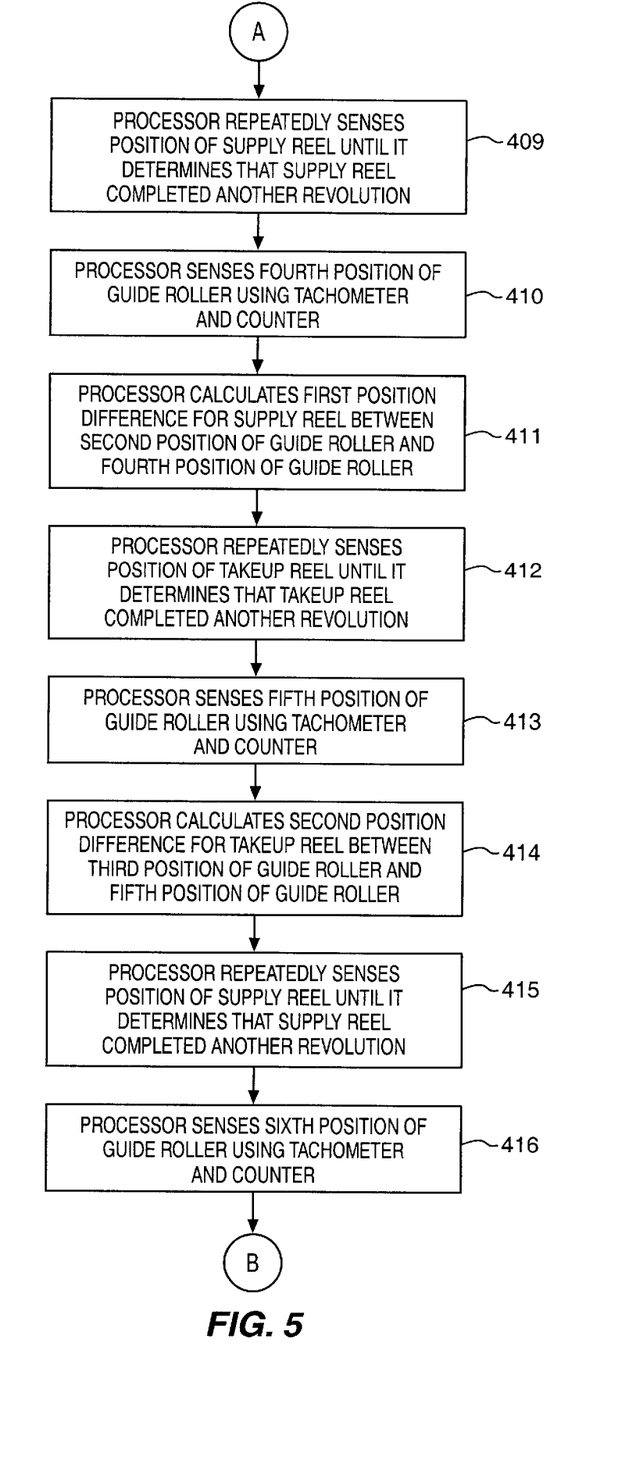
Figure 6:
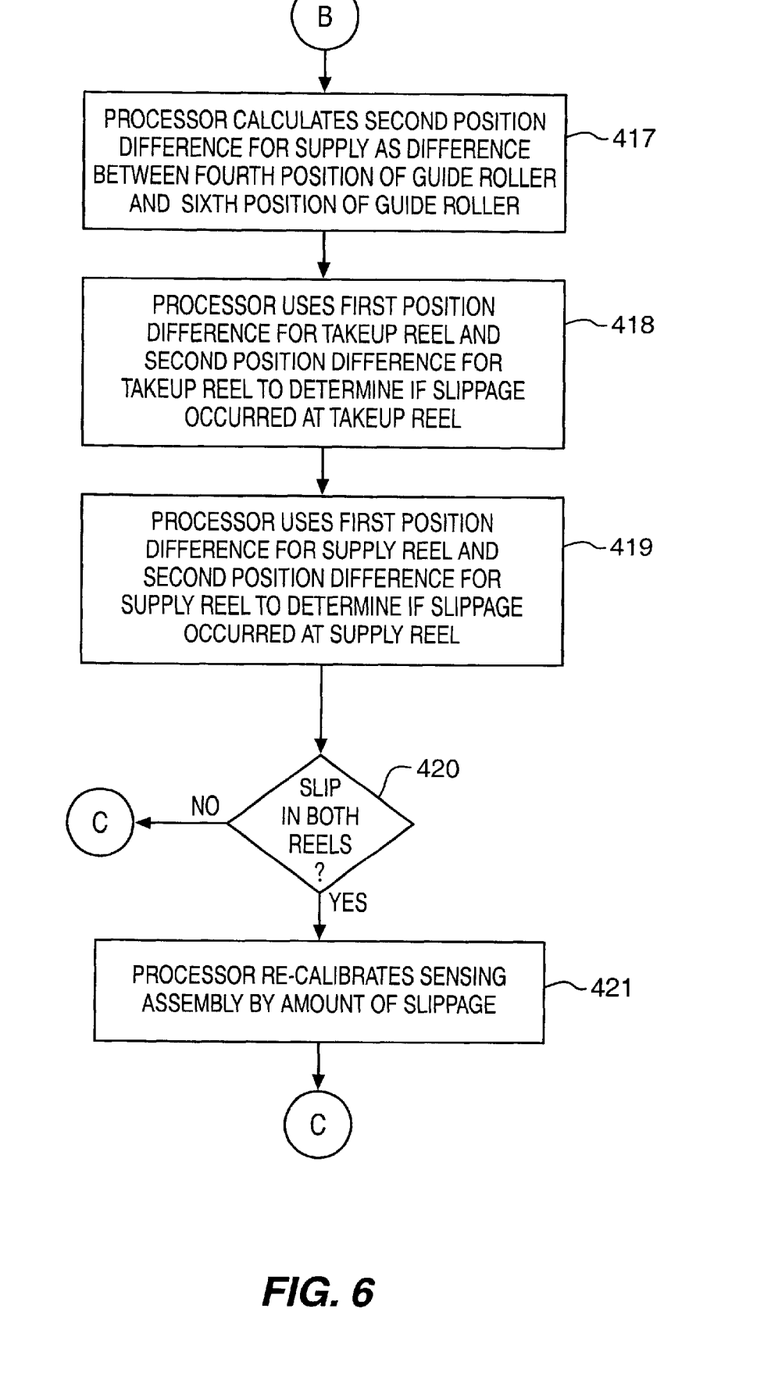

FIGS. 4–6 are a flowchart illustrating another example of the method according to the present invention. It is anticipated however, that one skilled in the art will recognize numerous other examples in accordance with the principles described below, and thus, the following examples are for the purpose of illustration and not limitation. Those skilled in the art will also appreciate that various features described below could be combined with the above described embodiment to form multiple variations of the invention.

In the example of FIGS. 4–6, the repeated position sensing of the guide roller 109 is used to derive a sequence of guide roller position counts each time the supply reel 116 completes one full revolution and each time the take-up reel 102 completes one full revolution. As with the above example, the tape media 112 is wound from the supply reel 116 to the take-up reel 102 and the tachometer 111 counts at a constant rate. The position of the guide roller 109 is sensed using the tachometer 111 and counter 114 each time the supply reel 116 completes one full revolution and each time the take-up reel 102 completes one full revolution. Each time the supply reel 116 completes a revolution, the processor 113 calculates a difference in the current position of the guide roller 109 and a subsequent position of the guide roller 109 to determine if slippage occurred at the supply reel 116. In addition, each time the take-up reel 102 completes a revolution, the processor 113 calculates a difference in the current position of the guide roller 109 and a subsequent position of the guide roller 109 to determine if slippage occurred at the take-up reel 102.

It will be obvious to those skilled in the art that the method described will also work if the sampling interval is taken to be any fraction or multiple of reel turns, although an integral multiple of one turn is desirable since effects of reel eccentricity are subtracted out. It will be further obvious to those skilled in the art that the index mark described previously may be a physical once-around sensor, or it may be a signal derived from other sensors that change at a different rate, such as the hail position sensors found on most brush less dc motors.

Advantageously, by comparing difference values for both the take-up reel 102 and the supply reel 116, it is possible to determine if slippage occurred in one of the two reels, or at the guide roller 109. For example, if a slippage is detected at the supply reel 116 but not at the take-up reel 102, it can be reliably determined that slippage occurred only at the take-up reel 102. Likewise if slippage is detected at the take-up reel 102 but not at the supply reel 116, it can be reliably determined that slippage occurred only at the supply reel 116. However, if slippage is detected at both the supply reel 116 and the take-up reel 102, it can be reliably determined that the slippage occurred at the guide roller 109 because the guide roller 109 is the common denominator between the supply reel 116 and the take-up reel 102. Since tape position is determined by the linear count of the tachometer 111 connected to the guide roller 109, slippage occurring only at the supply reel 116 or only at the take-up reel 102 does not affect the accuracy of the tape position and can be disregarded. Similarly, since slippage detected at the guide roller 109 affects the accuracy of the tape position, it can easily be corrected as previously described based on the amount of slippage detected.

FIG. 4 is a flowchart illustrating the method according to me graphical representation of FIG. 7. The operation begins at step 400. At step 401 the tape media 112 is wound in the forward direction between the supply reel 118 and the take-up reel 102. The tachometer 111, attached to the guide roller 109, also moves during this time, and the associated bi-directional tachometer position counter 114 increments. At step 402, the processor 113 repeatedly senses the position of the take-up reel 102 until it is determined that the take-up reel 102 has completed one revolution as indicated by the index mark. Substantially simultaneously to sensing the index mark, the processor 113 senses a first position of the guide roller 109 using the tachometer 111 and counter 114, at step 403. The first position of the guide roller 109 is representative of the tachometer count when the index mark on the take-up reel 102 is sensed indicating that the take-up reel 102 has completed one revolution. In FIG. 7, the first position has a value of (100) and the takeup reel position at the corresponding time is indicated by "n−2" on the x-axis.

At step 404, the processor 113 also repeatedly senses the position or ins supply reel 116 until it is determined that the supply reel 116 has completed one revolution as indicated by the index mark. Substantially simultaneously to sensing the index mark, the processor 113 senses a second position of the guide roller 109 using the tachometer 111 and counter 114, at step 405. The second position of the guide roller 109 is representative of the tachometer count when the index mark on the supply reel 116 is sensed indicating that the supply reel 116 has completed one revolution. For simplicity, FIG. 7 does not show the values sampled for the supply reel, as the method is the same as the method for the takeup reel. At step 406, the processor 113 continues to repeatedly senses the position of the take-up reel 102 until it is determined that the take-up reel 102 has completed another revolution as indicated by the index mark. Substantially simultaneously to sensing the index mark, the processor 113 senses a third position of the guide roller 109 using the tachometer 111 and counter 114, at step 407. The third position of the guide roller 109 is representative of the tachometer count when the index mark on the take-up reel 102 is sensed indicating that the take-up reel 102 has completed another revolution. At step 408, the processor 113 calculates a first position difference for the take-up reel 102 as the difference between the first position of the guide roller 109 and the third position of the guide roller 109. In FIG. 7, the first position of the guide roller 109 is (100) and the third position of the guide roller 109 is (301), as indicated by the tachometer count, the first position difference is equal to (201). To clarify the first position difference (201) is equal to the third position (301) minus the first position (100). Again, please note that the processor 113 is sampling both the supply reel and the takeup reel in this example and that the first and third positions relate to the takeup reel while the third position relates to the supply reel.

At step 409, the processor 113 repeatedly senses the position of the supply reel 116 until it is determined that the supply reel 116 has completed another revolution as indicated by the index mark. Substantially simultaneously to sensing the index mark, the processor 113 senses a fourth position of the guide roller 109 using the tachometer 111 and counter 114, at step 410. The fourth position of the guide roller 109 is representative of the tachometer count when the index mark on the supply reel 116 is sensed indicating that the supply reel 116 has completed another revolution. At step 411, the processor 113 calculates a first position difference for the supply reel 116 as the difference between the second position of the guide roller 109 and the fourth position of the guide roller 109. The second position and the for the position represent adjacent revolutions of the supply reel 116, while the third position corresponds to the takeup reel and is not used in the calculations for the supply reel 116.

At step 412, the processor 113 repeatedly senses the position of the take-up reel 102 until it is determined that the take-up reel 102 has completed another revolution as indicated by the index mark. Substantially simultaneously to sensing the index mark, the processor 113 senses a fifth position of the guide roller 109 using the tachometer 111 and counter 114, at step 413. The fifth position of the guide roller 109 is representative of the tachometer count when the index mark an the take-up reel 102 is sensed indicating that the take-up reel 102 has completed another revolution. In FIG. 7, the fifth position of the guide roller has a value of (501) and corresponds to the takeup reel position "n". At step 414, the processor 113 calculates a second position difference for the take-up reel 102 as the difference between the third position of the guide roller 109 and the fifth position of the guide roller 109. These sample represent adjacent revolutions of the takeup reel, while the second and the forth positions correspond to the supply reel and therefore, do not affect the takeup reel calculations. Continuing with the above example where the third position of the guide roller 109 is (301) and the fifth position of the guide roller 109 is (501), as shown in FIG. 7, the second position difference for the takeup reel is equal to (200).

At step 415, the processor 113 repeatedly senses the position of the supply reel 116 until it is determined that the supply reel 116 has completed another revolution as indicated by the index mark. Substantially simultaneously to sensing the index mark, the processor 113 senses a sixth position of the guide roller 109 (not shown in FIG. 7) using the tachometer 111 and counter 114, at step 416. The sixth position of the guide roller 109 is representative of the tachometer count when the index mark on the supply reel 116 is sensed indicating that the supply reel 116 has completed another revolution. At step 417, the processor 113 calculates a second position difference for the supply reel 116 as the difference between the fourth position of the guide roller 109 and the sixth position of the guide roller 109.

At step 418, the processor 113 uses the first position difference for the take-up reel 102 from step 206 and the second position difference for the take-up reel 102 from step 209 to determine if slippage occurred at the take-up reel 102 by calculating the compound position difference as described above. In FIG. 7, subtracting the first position difference (201) from the second position difference (200), for a compound position difference of (−1). In this example, the absolute value of the compound difference is of concern, although those skilled in the art will recognize that further information relating to the direction of the slip is available from the calculation. At step 419, the processor 113 uses the first position difference for the supply reel 116 from step 206 and the second position difference for the supply reel 116 from step 209 to determine if slippage occurred at the supply reel 116 403 by calculating the compound position difference as described above. If at step 420, no slippage is detected at either the supply reel 116 or the take-up reel 102, processing continues and steps 401 through 419 are repeated to continue sensing for slippage of the tape media 112. If at step 420, slippage is detected only at the supply reel 116 but not at the take-up reel 102, processing continues and steps 401 through 419 are repeated to continue sensing for slippage of the tape media 112. If at step 420, slippage is detected only at the take-up reel 102 but not at the supply reel 116, processing continues and steps 401 through 419 are repeated to continue sensing for slippage of the tape media 112, if at step 420, slippage is detected at both the supply reel 116 and the take-up reel 102, the processor 113 corrects for slippage by pre-loading the counter 114. For example, if the compound position difference is equal to (37) indicating slippage of the tape media 112, the processor 113 pre-loads the counter 114 with the last expected value.

Advantageously, tachometer 111 not only provides continuous tachometer information without interruption, but tachometer 111 is also bi-directional so that slippage can be determined regardless of the winding direction between the supply reel 116 and the take-up reel 102. Those skilled in the art will appreciate that signals from the first and second positioning systems, 105 and 106, and the tachometer 111 can be made available to the processor 113 that are indicative of direction. These signals may then be used in conjunction with the difference in tachometer count to determine polarity of any correction. The method works well because the tape media 112 and the guide roller 109 are unlikely to be moving in opposite directions when slippage occurs.

During operation, the tape drive may stop and restart motion in the same direction. The previously described examples are based on position of the supply reel, the take-up reel and a guide roller, and is therefore, unaffected by starting and stopping of the winding of the tape media between the supply reel and the take-up reel. A tape drive may also be wound in a forward direction, stopped and rewound in the reverse direction. The tachometer is bi-directional, i.e. it counts up in one direction and counts down in the opposite direction, and therefore the first difference value should be close to zero for one cycle after a change in directional rotation.

Figure 9:
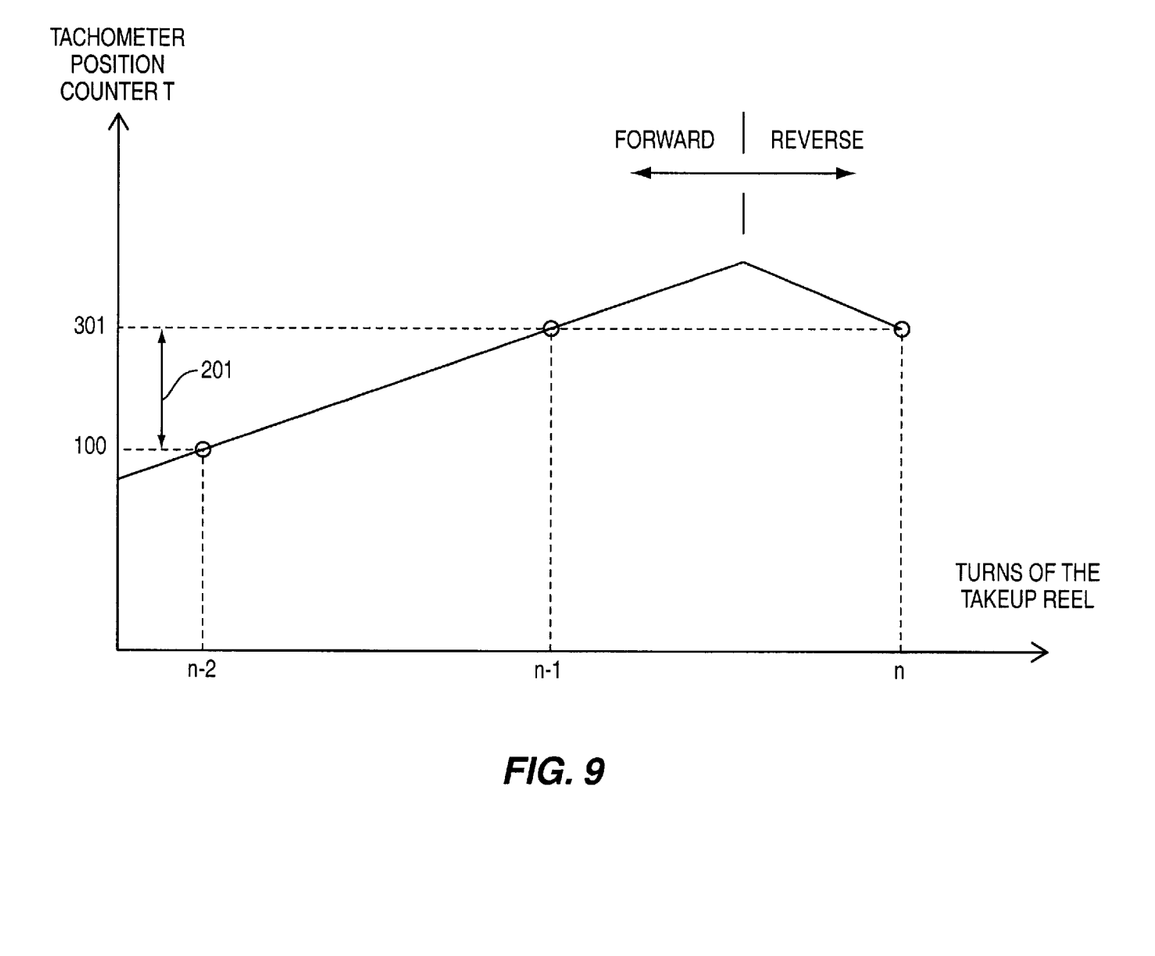
FIG. 9 is a graphical representation of the position counts during a change in tape media winding direction according to the method of the present invention.

If the tape media is wound in the forward direction, the tachometer counts at a continuous rate in an upward direction if the tape speed is constant in linear terms as illustrated in the graphical representation of FIG. 9. The tape media 112 is wound in the forward direction from the supply reel 116 to the take-up reel 102. The tachometer 111 attached to the guide roller 109 begins to move at this time, and the associated bi-directional tachometer position counter 114 begins incrementing. Processor 113 repeatedly senses the position of the take-up reel 102 until it is determined that the take-up reel 102 has completed one full revolution as indicated by the index mark. Substantially simultaneously to sensing the index mark, the processor 113 senses a first position of the guide roller 109 using the tachometer 111 and counter 114.

Processor 113 repeatedly senses the position of the take-up reel 102 until it is determined that the take-up reel 102 has completed another revolution as indicated by the index mark. Substantially simultaneously to sensing the index mark, the processor 113 senses a second position of the guide roller 109 using the tachometer 111 and counter 114. Processor 113 calculates a first position difference between the first position of the guide roller 109 and the second position of the guide roller 109. For example, if the first position count of the guide roller 109 is (100) and the second position count of the guide roller 109 is (301), as indicated by the tachometer count, the first position difference is equal to (201). To clarify the first position difference (201) is equal to the second position (301) minus the first position (100).

The tape media 112 continues being would in the forward direction from the supply reel 116 to the take-up reel 102 until the movement of the tape media is stopped. Tape media 112 is rewound through the tape path in the reverse direction from the take-up reel 102 to the supply reel 116. The tachometer 111, attached to the guide roller 109, begins to move at this time, and the associated bi-directional tachometer position counter 114 begins decrementing the previous forward count. Processor 113 repeatedly senses the position of the take-up reel 102 until it is determined that the take-up reel 102 has completed another revolution as indicated by the index mark. Substantially simultaneously to sensing the index mark, the processor 113 senses a third position of the guide roller 109 using the tachometer 111 and counter 114. In this example, the take-up reel 102 has reversed direction and has returned to the previously recorded index mark. In the forward direction, the take-up reel 102 passed the index mark and completed a partial rotation prior to reversing direction. For example, if the second position count is (301) and the third position count is (301), as indicated by the tachometer count, the second position difference count is equal to zero (0). To clarify the second position difference is equal to the third position (301) minus the second position (301).

To determine if slippage occurred, the processor compares the third position with the second position. If the difference is less than a predetermined threshold, the processor 113 determines that slippage of the tape media 112 did not occur. However, if the difference is greater than the predetermined threshold the processor 113 determines that slippage of the tape media 112 occurred. It is determined at step 613 that slippage has occurred, the processor 113 re-calibrates the sensing assembly at step 614 by the amount of the slippage as previously described.

The above-described processor can be comprised of instructions that are stored on storage media. The instructions can be retrieved and executed by the microprocessor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media. Those skilled in the art will also appreciate variations of the above-described embodiments that fall within the scope of the invention. As a result, the invention is not limited to the specific examples and illustrations discussed above, but only by the following claims and their equivalents.

What is claimed is:

1. A method in a tape drive for detecting slippage of a magnetic tape media in a tape path during winding of the magnetic tape media between a supply reel and a take-up reel, the method comprising the steps of:

sensing a first position of one of the supply reel and the take-up reel;

sensing a first position of a guide roller;

winding the tape media through the tape path between the supply reel and the take-up reel;

sensing a second position of the one of the supply reel and the take-up reel which results from winding the tape media;

sensing a second position of the guide roller which results from winding the tape media;

determining a first position difference between the first position of the guide roller and the second position of the guide roller;

sensing a third position of the one of the supply reel and the take-up reel which results from winding the tape media:

sensing a third position of the guide roller which results from winding the tape media;

determining a second position difference between the second position of the guide roller and the third position of the guide roller;

determining a first compound position difference between the first position difference and the second position difference; and using the first compound position difference to determine if slippage of the magnetic tape media occurred.

2. The method of claim 1 further comprising the steps of:

sensing a first position of the other one of the supply reel and the take-up reel;

sensing a fourth position of the guide roller;

sensing a second position of the other one of the supply reel and the take-up reel which results from the winding of the tape media;

sensing a fifth position of the guide roller which results from the winding of the tape media;

determining a third position difference between the fourth position of the guide roller and the fifth position of the guide roller;

sensing a third position of the other one of the supply reel and the take-up reel which results from the winding of the tape media;

sensing a sixth position of the guide roller which results from the winding of the tape media;

determining a fourth position difference between the fifth position of the guide roller and the sixth position of the guide roller;

determining a second compound position difference between said third position difference and said fourth position difference; and using the second compound position difference to determine if slippage of the magnetic tape media occurred.

3. The method of claim 2 wherein the step of sensing the second position of the other one of the supply reel and the take-up reel comprises:

sensing the second position of the other one of the supply reel and the take-up reel to complete one revolution.

4. The method of claim 2 further comprising the step of:

responsive to a positive determination that slippage of the magnetic tape media occurred, correcting a positioning system in the tape drive to account for the slippage.

5. The method of claim 4 wherein the step of correcting the positioning system comprises:

setting a tachometer count to account for the amount of slippage of the tape media; and correcting in a processor, the current indication of the tape position to a new position to account for the amount of slippage of the tape media.

6. The method of claim 1 wherein the step of sensing the second position of the one of the supply reel and the take-up reel comprises:

sensing the second position of the first one of the supply reel and the take-up reel to complete one revolution.

7. A method for detecting slippage of a tape media in a tape path during winding of the tape media between tape reels in a tape transport device, the method comprising the steps of:

sensing evenly spaced angular positions of a first tape reel;

measuring a first linear distance traveled by said tape media as said tape media travels within said tape path as said first tape reel rotates through a plurality of adjacent ones of said evenly spaced angular positions;

determining a first linear distance difference between at least two measured linear distances representative of said first tape reel rotating through adjacent ones of said evenly spaced angular positions; and comparing said first linear distance difference to a first predetermined threshold, wherein if said first linear distance difference is greater than said first predetermined threshold, a slippage has occurred; and wherein said measuring a first linear distance traveled by said tape media comprises sensing a position of a guide roller, located within said tape path traveled by said tape media, corresponding to said first tape reel being in one of said plurality of adjacent ones of said evenly spaced angular positions.

8. The method of claim 7 wherein said sensing evenly spaced angular positions comprises:

sensing a first angular position of said first tape reel; and sensing a next evenly spaced angular position of said first tape reel.

9. The method of claim 8 further comprising:

sensing a first position of said guide roller, located within said tape path traveled by said tape media, corresponding to said first tape reel being in a first of said evenly spaced angular positions; and sensing a next position of said guide roller corresponding to said first tape reel being in a second of said evenly spaced angular positions.

10. The method of claim 7, wherein determining a first linear distance difference comprises;

comparing said first linear distance traveled by said tape media as said tape media travels within said tape path as said first tape reel rotates through one of said plurality of adjacent ones of said evenly spaced angular positions to a second linear distance traveled by said tape media as said tape media travels within said tape path as said first tape reel rotates through an adjacent one of said plurality of adjacent ones of said evenly spaced angular positions.

11. The method of claim 7 wherein said guide roller is connected to a position sensing device.

12. The method of claim 7 wherein said evenly spaced angular positions of said first tape reel are an integral number of revolutions apart.

13. The method of claim 7 further comprising:

sensing evenly spaced angular positions of a second tape reel in said tape transport device;

measuring a third linear distance traveled by said tape media as said tape media travels within said tape path as said second tape reel rotates through a plurality of adjacent ones of said evenly spaced angular positions;

determining a second linear distance difference between at least two measured linear distances representative of said second tape reel rotating through adjacent ones of said evenly spaced angular positions; and comparing said second linear distance difference to a second predetermined threshold, wherein if said second linear distance difference is greater than said second predetermined threshold, a slippage has occurred.

14. The method of claim 13 further comprising:

comparing one of said first and said second linear distance differences traveled by said tape media between said evenly spaced angular positions of said tape reel to an adjacent one of said linear distance differences traveled by said tape media between an adjacent one of said evenly spaced linear distances to obtain a compound linear distance difference; and comparing said compound linear distance difference to a third predetermined number to determine if slippage occurred.

* * * * *